US010290215B2

(12) United States Patent
Marco et al.

(10) Patent No.: US 10,290,215 B2
(45) Date of Patent: May 14, 2019

(54) SYSTEM FOR NAVIGATING GROUPED PASSENGERS FROM AN EVENT

(71) Applicant: GT Gettaxi Limited, Limassol (CY)

(72) Inventors: Talmon Marco, Tel Aviv (IL); Ziv Haparnas, Bellevue, WA (US); David Agasi, Kiryat Ono (IL)

(73) Assignee: GT Gettaxi Limited, Limassol (CY)

(*) Notice: Subject to any disclaimer, the term of this patent is extended or adjusted under 35 U.S.C. 154(b) by 771 days.

(21) Appl. No.: 14/876,562

(22) Filed: Oct. 6, 2015

(65) Prior Publication Data
US 2017/0098224 A1 Apr. 6, 2017

Related U.S. Application Data

(63) Continuation of application No. 14/876,094, filed on Oct. 6, 2015, which is a continuation of application No. 14/876,335, filed on Oct. 6, 2015, now Pat. No. 10,055,995.

(51) Int. Cl.
G06F 19/00 (2018.01)
G08G 1/00 (2006.01)
G06Q 10/06 (2012.01)
G06Q 30/02 (2012.01)
G06Q 50/30 (2012.01)
G01C 21/34 (2006.01)
G06Q 50/00 (2012.01)
G06Q 50/32 (2012.01)
G01C 21/36 (2006.01)

(52) U.S. Cl.
CPC ............ *G08G 1/202* (2013.01); *G01C 21/34* (2013.01); *G01C 21/3438* (2013.01); *G01C 21/362* (2013.01); *G06Q 10/063118* (2013.01); *G06Q 30/0202* (2013.01); *G06Q 30/0223* (2013.01); *G06Q 50/01* (2013.01); *G06Q 50/30* (2013.01); *G06Q 50/32* (2013.01)

(58) Field of Classification Search
CPC .... G08G 1/202; G01C 21/3438; G06Q 50/01; G06Q 50/30
USPC .......................................................... 701/537
See application file for complete search history.

(56) References Cited

U.S. PATENT DOCUMENTS

| 6,437,743 | B1* | 8/2002 | Mintz .................. G01S 5/0027 342/457 |
| 7,113,864 | B2 | 9/2006 | Smith et al. |
| 8,090,707 | B1 | 1/2012 | Orttung et al. |
| 8,495,244 | B2 | 7/2013 | Bonar et al. |
| 9,514,473 | B2 | 12/2016 | Sen |
| 9,820,108 | B1 | 11/2017 | Inciong et al. |
| 2002/0019760 | A1 | 2/2002 | Murakami et al. |

(Continued)

OTHER PUBLICATIONS

Non-Final Office Action dated Dec. 20, 2017, on U.S. Appl. No. 14/876,094.

(Continued)

*Primary Examiner* — Ronnie M Mancho
(74) *Attorney, Agent, or Firm* — Lowenstein Sandler LLP

(57) ABSTRACT

In one embodiment an event likely to be attended by a plurality of users of a taxi service is identified. A location of the event is determined and an end time of the event is estimated. Prior to the end time of the event, a plurality of drivers associated with the taxi service are directed to drive to the location of the event to transport passengers from the location of the event.

20 Claims, 5 Drawing Sheets

(56) References Cited

U.S. PATENT DOCUMENTS

| | | | |
|---|---|---|---|
| 2003/0055689 A1* | 3/2003 | Block | G06Q 10/02 705/5 |
| 2003/0069797 A1 | 4/2003 | Harrison | |
| 2003/0153330 A1* | 8/2003 | Naghian | G01C 21/00 455/456.1 |
| 2004/0243430 A1* | 12/2004 | Horstemeyer | B60R 25/102 340/928 |
| 2004/0260470 A1* | 12/2004 | Rast | G06Q 10/06 701/300 |
| 2009/0030885 A1 | 1/2009 | DePasquale et al. | |
| 2009/0254971 A1 | 10/2009 | Herz et al. | |
| 2011/0040603 A1* | 2/2011 | Wolfe | G06Q 30/02 705/7.31 |
| 2011/0099040 A1 | 4/2011 | Felt et al. | |
| 2012/0023033 A1 | 1/2012 | Tomasz | |
| 2012/0041675 A1 | 2/2012 | Juliver et al. | |
| 2012/0109721 A1* | 5/2012 | Cebon | G06Q 30/06 705/13 |
| 2013/0024249 A1* | 1/2013 | Zohar | G06Q 10/06 705/13 |
| 2013/0132140 A1 | 5/2013 | Amin et al. | |
| 2013/0218455 A1 | 8/2013 | Clark | |
| 2013/0253999 A1 | 9/2013 | Pinkus et al. | |
| 2013/0295963 A1* | 11/2013 | Sen | H04W 4/21 455/456.3 |
| 2013/0297551 A1 | 11/2013 | Smith et al. | |
| 2014/0149164 A1 | 5/2014 | Yumbe et al. | |
| 2015/0161564 A1 | 6/2015 | Sweeney et al. | |
| 2015/0170233 A1* | 6/2015 | Lisitsa | H01L 23/427 705/26.1 |
| 2015/0176997 A1 | 6/2015 | Pursche et al. | |
| 2015/0271290 A1 | 9/2015 | Tao et al. | |
| 2015/0317589 A1 | 11/2015 | Anderson et al. | |
| 2015/0324717 A1* | 11/2015 | Lord | G06Q 10/063114 705/7.13 |
| 2015/0324718 A1* | 11/2015 | Lord | G06Q 50/30 705/7.13 |
| 2015/0324729 A1 | 11/2015 | Lord et al. | |
| 2015/0324945 A1 | 11/2015 | Lord et al. | |
| 2016/0117610 A1* | 4/2016 | Ikeda | G06Q 10/02 705/5 |
| 2016/0203649 A1 | 7/2016 | Berkobin et al. | |
| 2016/0335576 A1* | 11/2016 | Peng | G06Q 10/06315 |
| 2016/0364678 A1* | 12/2016 | Cao | G06Q 50/30 |
| 2016/0364812 A1 | 12/2016 | Cao | |
| 2016/0364823 A1 | 12/2016 | Cao | |
| 2017/0098184 A1 | 4/2017 | Marco et al. | |
| 2017/0098377 A1 | 4/2017 | Marco et al. | |
| 2017/0132540 A1 | 5/2017 | Haparnas et al. | |

OTHER PUBLICATIONS

Non-Final Office Action dated Jul. 12, 2017, on U.S. Appl. No. 14/876,335.
Final Office Action dated Jan. 24, 2018, on U.S. Appl. No. 14/876,335.
USPTO, Office Action for U.S. Appl. No. 14/876,335, dated Jul. 12, 2017.
Non-Final Office Action dated Mar. 5, 2018, on U.S. Appl. No. 14/933,724.
Takeshi Sakaki et al., "Real-time Event Extraction for Driving Information from Social Sensors, Proceeding of the 2012 IEEE International Conference of Cyber Technology in Automation, Control and Interlligent Systems" 2012.
Final Office Action dated Jul. 6, 2018, on U.S. Appl. No. 14/876,094.
Notice of Allowance dated May 15, 2018, on U.S. Appl. No. 14/876,335.
Advisory Action dated Sep. 14, 2018, on U.S. Appl. No. 14/876,094.
Advisory Action dated Oct. 4, 2018, on U.S. Appl. No. 14/933,724.

* cited by examiner

US 10,290,215 B2

SYSTEM FOR NAVIGATING GROUPED PASSENGERS FROM AN EVENT

CLAIM OF PRIORITY

This Application is a continuation of U.S. application Ser. No. 14/876,335, filed on Oct. 6, 2015 and entitled "SYSTEM FOR PREEMPTIVELY NAVIGATING DRIVERS TO AN EVENT CREATED THROUGH A SOCIAL NETWORK SYSTEM", which is a continuation of U.S. application Ser. No. 14/876,094, filed on Oct. 6, 2015 and entitled "SYSTEM FOR PREEMPTIVELY NAVIGATING DRIVERS TO AN EVENT LOCATION TO TRANSPORT PASSENGERS UPON COMPLETION OF AN EVENT, which are both hereby incorporated by reference herein in their entirety.

TECHNICAL FIELD

This disclosure relates in general to the field of mobile applications and, more particularly, to a system for preemptively navigating drivers to an event location to transport passengers upon completion of the event.

BACKGROUND

A taxi service may utilize a plurality of drivers that fulfill passenger requests for transportation. A taxi service may provide one or more mobile applications that facilitate the efficient pairing of passengers and drivers. The taxi service may receive a passenger request and select a driver to fulfill the request based on information associated with the passenger request and information associated with the driver.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

In one embodiment an event likely to be attended by a plurality of users of a taxi service is identified. A location of the event is determined and an end time of the event is estimated. Prior to the end time of the event, a plurality of drivers associated with the taxi service are directed to drive to the location of the event to transport passengers from the location of the event.

Example Embodiments

Figure 1:
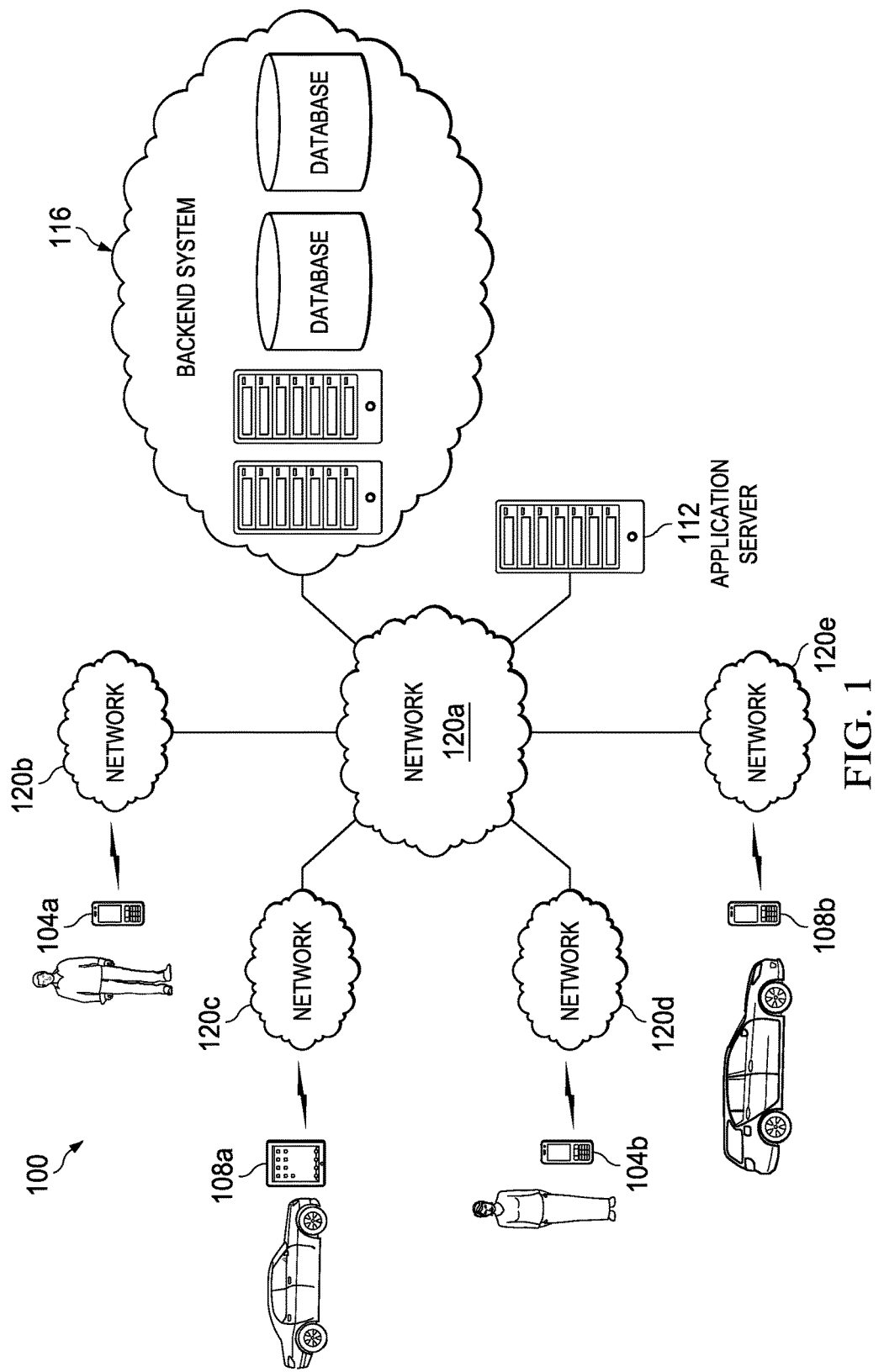
FIG. 1 illustrates a block diagram of a system for preemptively navigating drivers to an event location in accordance with certain embodiments.

FIG. 1 illustrates a block diagram of a system 100 for preemptively navigating drivers to an event location in accordance with certain embodiments. Although various embodiments may include any number of drivers, passengers, and associated devices, system 100 depicts two passengers having associated passenger mobile devices 104 and two drivers having associated driver mobile devices 108. The mobile devices are coupled through various networks 120 to an application server 112 and a backend system 116.

Various embodiments of the present disclosure may enhance the experience of drivers and passengers associated with a taxi service by preemptively directing drivers to an event location so that they are ready to transport passengers from the event upon the completion of the event. Various embodiments includes systems and methods for identifying information associated with an event (such as the event's time and location), estimating a demand for drivers to transport passengers from the event, estimating an end time of the event, and directing drivers to the location of the event in accordance with the end time and estimated demand for drivers.

Mobile devices 104 and 108 may include any electronic computing device operable to receive, transmit, process, and store any appropriate data. For example, mobile devices 104 and 108 may include laptop computers, tablet computers, smartphones, personal digital assistants, and other devices capable of connecting (e.g., wirelessly) to one or more networks 120. Mobile devices 104 and 108 may include a set of programs such as operating systems (e.g., Microsoft Windows, Linux, Android, Mac OSX, Apple iOS, UNIX, or similar operating system), applications, plug-ins, applets, virtual machines, machine images, drivers, executable files, and other software-based programs capable of being run, executed, or otherwise used by the respective devices. Each mobile device can include at least one graphical display and user interface allowing a user to view and interact with applications and other programs of the mobile device. In a particular embodiment, driver mobile devices may be a hardened device that is configured to only run a taxi driver application using a specialized operating system (e.g., a modified version of Android). In one embodiment, a taxi service may issue or otherwise facilitate the provision of hardened devices to its drivers, but restrict the functionality of the devices to the taxi driver application (i.e., the devices may be locked down so as not to allow the installation of additional applications).

In various embodiments, a driver mobile device 108 may be integrated within and/or communicate with a self-driven vehicle (e.g., a vehicle that has the capability of driving without physical steering guidance from a human being) and may influence the movement of the vehicle by providing route information (e.g., passenger pick-up and destination locations or driver destination locations) to the self-driven vehicle. Accordingly, as used herein "driver" may refer to a human being that may physically drive or otherwise control movement of a vehicle or the vehicle itself (e.g., in the case of a self-driven vehicle) or component thereof (e.g., mobile device application 108 or logic therein).

In particular embodiments, a taxi passenger application runs on passenger mobile devices 104. The application may allow a user to enter various account information (e.g., in connection with a registration with the taxi service) to be utilized by a taxi service. For example, the account information may include a user name and password (or other login credentials), contact information of the user (e.g., phone number, home address), payment information (e.g., credit card numbers and associated information), or car preference information (e.g., what models or color of car the user prefers).

The application may allow a user to request a ride from the taxi service. In various embodiments, the application may establish a pick-up location automatically or based on user input (e.g., locations may include the current location of the mobile device 104 as determined by a global positioning system (GPS) of the mobile device or a different user-specified location). In certain embodiments, the user may specify a destination location as well. The locations may be specified in any suitable format, such as GPS coordinates, street address, establishment name (e.g., LaGuardia Airport, Central Park, etc.), or other suitable format. At any time (e.g., before the ride, during the ride, or after the ride is complete) the user may specify a method of payment to be used for the ride. The user may also specify whether the request is for immediate pick-up or for a specified time in the future. In various embodiments, the user may specify pick-up by a vehicle that has particular merchandise available for use by the user, such as a specified type of battery charger, bottle of water or other food or beverage, umbrella, or other suitable merchandise. The user may also specify criteria for the driver, such as a minimum performance rating, such that drivers having performance ratings below the minimum performance rating will not be considered during selection of the driver.

The user may use the application to order a ride based on the specified information. The request for the ride is generated based on the information and transmitted to backend system 116. Backend system 116 will facilitate the selection of a driver. In some embodiments, backend system 116 may select a driver based on any suitable factors, such as the information contained in the request from the passenger, the proximity of the driver to the passenger, or other suitable factors. In other embodiments, backend system 116 may select a plurality of drivers that could fulfill the ride request, send information associated with the drivers to the passenger, and allow the passenger to select the driver to be used via the application on the passenger mobile device 104. Any suitable information about the potential driver(s) may be sent to the mobile device 104 either before or after the selection of the driver by the passenger, such as a location of a driver, an estimated pick-up time, a type of car used by a driver, the merchandise available in the car, a driver rating or comments made by other passengers about the driver, or other suitable information.

Once a driver has been selected and has accepted the request to provide a ride, the application may notify the user of the selected driver and provide real-time updates of the driver's location (e.g., with respect to the passenger's location) and estimated pick-up time. The application may also provide contact information for the driver and/or the ability to contact the driver through the application (e.g., via a phone call or text). Once the ride has begun, the application may display any suitable information, such as the current location of the mobile device 104 and the route to be taken. Upon completion of the ride, the application may provide the passenger the ability to rate the driver or provide comments about the driver.

In particular embodiments, a taxi driver application runs on driver mobile devices 108. The application may allow a driver to enter various account information to be utilized by a taxi service. For example, the account information may include a user name and password (or other login credentials), contact information of the driver (e.g., phone number, home address), information used to collect payment (e.g., bank account information), vehicle information (e.g., what model or color of car the driver utilizes), merchandise offered by the driver, or other suitable information.

In various embodiments, the application may allow a driver to specify his availability to transport passengers for the taxi service. The application may periodically transmit the current location of the mobile device 108 as determined by a GPS of the mobile device 108 to the backend system 116. When a driver is selected to provide a ride, backend system 116 may send a notification to the taxi driver application. In some embodiments, the driver may have a limited amount of time to select whether the driver accepts the ride. In other embodiments, the application may be configured by the driver to automatically accept the ride or to automatically accept the ride if certain criteria are met (e.g., fare minimum, direction of travel, minimum passenger rating, etc.).

Once a pairing of the driver and the passenger is confirmed, the application may navigate the driver to the passenger. The application may also provide contact information for the passenger and/or the ability to contact the passenger through the application (e.g., via a phone call or text). The application may also navigate the driver to the passenger's destination once the ride begins. Upon completion of the ride, the application may provide the driver the ability to rate the passenger or provide comments about the passenger.

System 100 may include one or more application servers 112 coupled to the mobile devices through one or more networks 120. The taxi passenger application and taxi driver application may be supported with, downloaded from, served by, or otherwise provided through an application server 112 or other suitable means. In some instances, the applications can be downloaded from an application storefront onto a particular mobile device using storefronts such as Google Android Market, Apple App Store, Palm Software Store and App Catalog, RIM App World, etc., as well as other sources. In various embodiments, the taxi passenger application and taxi driver application may be installed on their respective devices in any suitable manner and at any suitable time. As one example, a taxi passenger application may be installed on a mobile device as part of a suite of applications that are pre-installed prior to provision of the mobile device to a consumer. As another example, a taxi driver application may be installed on a mobile device by a taxi service (or an entity that provisions mobile devices for the taxi service) prior to the issuance of the device to a driver that is employed or otherwise associated with the taxi service.

As described above, applications utilized by mobile devices 104 and 108 can make use of a backend system 116. Backend system 116 may comprise any suitable servers or other computing devices that facilitate the provision of a taxi service as described herein. For example, backend system 116 may receive a request from a passenger and facilitate the assignment of a driver to fulfill the request. Backend system 116 is described in more detail in connection with FIG. 3.

In general, "servers," and other "computing devices" may include electronic computing devices operable to receive, transmit, process, store, or manage data and information associated with system 100. As used in this document, the term "computing device," is intended to encompass any suitable processing device. For example, portions of system 100 may be implemented using computers other than servers, including server pools. Further, any, all, or some of the computing devices may be adapted to execute any operating system, including Linux, UNIX, Windows Server, etc., as well as virtual machines adapted to virtualize execution of a particular operating system, including customized and proprietary operating systems.

Further, servers and other computing devices of system 100 can each include one or more processors, computer-readable memory, and one or more interfaces, among other features and hardware. Servers can include any suitable software component or module, or computing device(s) capable of hosting and/or serving a software application or services (e.g., services of application server 112 or backend system 116), including distributed, enterprise, or cloud-based software applications, data, and services. For instance, servers can be configured to host, serve, or otherwise manage data sets, or applications interfacing, coordinating with, or dependent on or used by other services, including taxi service applications and software tools. In some instances, a server, system, subsystem, or computing device can be implemented as some combination of devices that can be hosted on a common computing system, server, server pool, or cloud computing environment and share computing resources, including shared memory, processors, and interfaces.

In various embodiments, backend system 116 or any components thereof may be deployed using a cloud service such as Amazon Web Services, Microsoft Azure, or Google Cloud Platform. For example, the functionality of the backend system 116 may be provided by virtual machine servers that are deployed for the purpose of providing such functionality or may be provided by a service that runs on an existing platform.

System 100 also includes various networks 120 used to communicate data between the mobile devices 104 and 108, the backend system 116, and the application server 112. The networks 120 described herein may be any suitable network or combination of one or more networks operating using one or more suitable networking protocols. A network may represent a series of points, nodes, or network elements and interconnected communication paths for receiving and transmitting packets of information. For example, a network may include one or more routers, switches, firewalls, security appliances, antivirus servers, or other useful network elements. A network may provide a communicative interface between sources and/or hosts, and may comprise any public or private network, such as a local area network (LAN), wireless local area network (WLAN), metropolitan area network (MAN), Intranet, Extranet, Internet, wide area network (WAN), virtual private network (VPN), cellular network (implementing GSM, CDMA, 3G, 4G, LTE, etc.), or any other appropriate architecture or system that facilitates communications in a network environment depending on the network topology. A network can comprise any number of hardware or software elements coupled to (and in communication with) each other through a communications medium. In some embodiments, a network may simply comprise a transmission medium such as a cable (e.g., an Ethernet cable), air, or other transmission medium.

Figure 2:
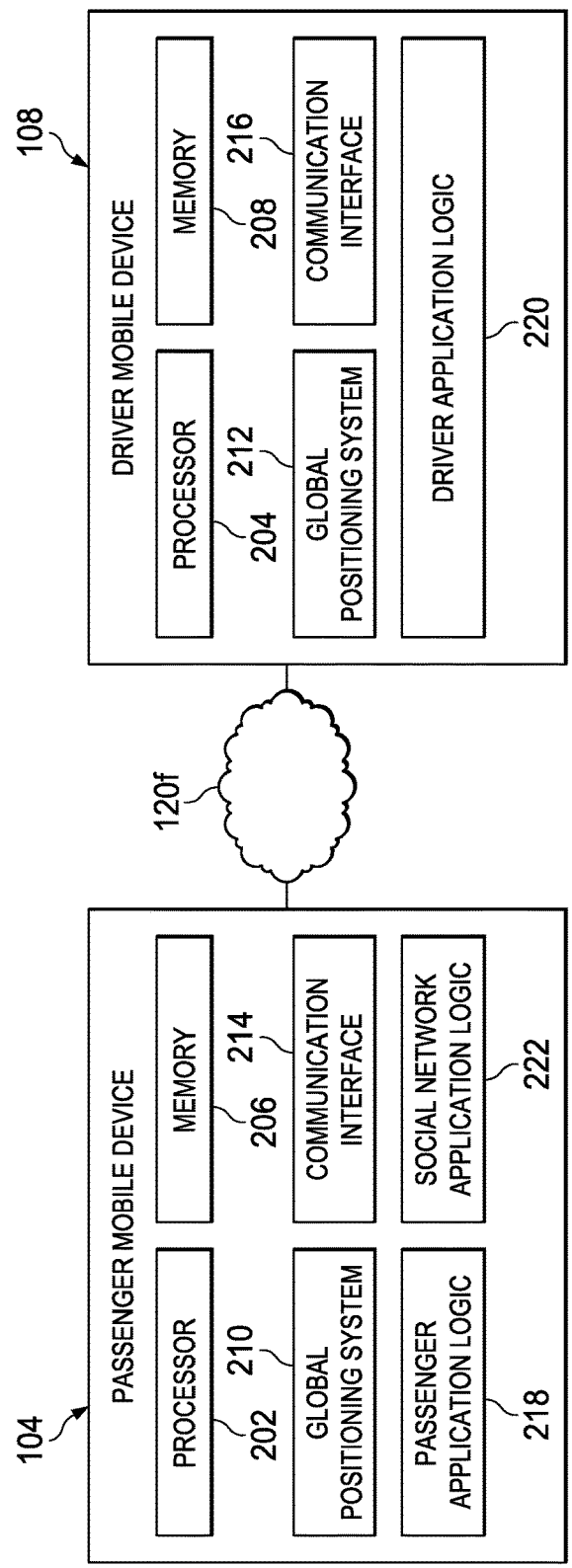
FIG. 2 illustrates a block diagram of a passenger mobile device and a driver mobile device of the system of FIG. 1 in accordance with certain embodiments.

FIG. 2 illustrates a block diagram of a passenger mobile device 104 and a driver mobile device 108 of the system of FIG. 1 in accordance with certain embodiments. In the embodiment shown, the devices may be communicatively coupled through network 120f which may include any suitable intermediary nodes, such as a backend system 116.

In the embodiment depicted, mobile devices 104 and 108 each include a computer system to facilitate performance of their respective operations. In particular embodiments, a computer system may include a processor, storage, and one or more communication interfaces, among other components. As an example, mobile devices 104 and 108 each include one or more processors 202 and 204, memory elements 206 and 208, and communication interfaces 214 and 216, among other hardware and software. These components may work together in order to provide functionality described herein.

Processors 202 and 204 may be a microprocessor, controller, or any other suitable computing device, resource, or combination of hardware, stored software and/or encoded logic operable to provide, either alone or in conjunction with other components of mobile devices 104 and 108, the functionality of these mobile devices. In particular embodiments, mobile devices 104 and 108 may utilize multiple processors to perform the functions described herein.

A processor can execute any type of instructions to achieve the operations detailed in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Memory 206 and 208 may comprise any form of non-volatile or volatile memory including, without limitation, random access memory (RAM), read-only memory (ROM), magnetic media (e.g., one or more disk or tape drives), optical media, solid state memory (e.g., flash memory), removable media, or any other suitable local or remote memory component or components. Memory 206 and 208 may store any suitable data or information utilized by mobile devices 104 and 108, including software embedded in a computer readable medium, and/or encoded logic incorporated in hardware or otherwise stored (e.g., firmware). Memory 206 and 208 may also store the results and/or intermediate results of the various calculations and determinations performed by processors 202 and 204.

Communication interfaces 214 and 216 may be used for the communication of signaling and/or data between mobile devices 104 and 108 and one or more networks (e.g., 120f) and/or network nodes (e.g., backend system 116 and application server 112) coupled to a network or other communication channel. For example, communication interfaces 214 and 216 may be used to send and receive network traffic such as data packets. Each communication interface 214 and 216 may send and receive data and/or signals according to a distinct standard such as an LTE, IEEE 802.11, IEEE 802.3, or other suitable standard. Communication interfaces 214 and 216 may include antennae and other hardware for transmitting and receiving radio signals to and from other devices in connection with a wireless communication session over one or more networks 120.

GPS units 210 and 212 may include any suitable hardware and/or software for detecting a location of their respective mobile devices 104 and 108. For example, a GPS unit may comprise a system that receives information from GPS satellites, wireless or cellular base stations, and/or other suitable source and calculates a location based on this information (or receives a calculated position from a remote source). In one embodiment, the GPS unit is embodied in a GPS chip.

Application logic 218 may include logic providing, at least in part, the functionality of the taxi passenger application described herein. Similarly, application logic 220 may include logic providing, at least in part, the functionality of the taxi driver application described herein. In a particular embodiment, the logic of devices 104 and 108 may include software that is executed by processor 202 and 204. However, "logic" as used herein, may include but not be limited to hardware, firmware, software and/or combinations of each to perform a function(s) or an action(s), and/or to cause a function or action from another logic, method, and/or system. In various embodiments, logic may include a software controlled microprocessor, discrete logic (e.g., an application specific integrated circuit (ASIC)), a programmed logic device (e.g., a field programmable gate array (FPGA)), a memory device containing instructions, combinations of logic devices, or the like. Logic may include one or more gates, combinations of gates, or other circuit components. Logic may also be fully embodied as software.

In various embodiments of the present disclosure, in addition to any combination of the features described above with respect to the taxi passenger application, application logic 218 may provide additional features for the taxi passenger application to enhance a passenger's experience.

In various embodiments, application logic 218 may provide passengers with the ability to indicate the occurrence of an event, whether the passenger will attend an event, and any other information associated with an event. The application logic 218 may allow a user to enter any suitable information associated with an event, such as a date and time of the event, a location of the event, an expected attendance at the event, an estimated end time of the event, a request for transportation from the event (and preferences associated with the transportation), or other suitable information. This information may be sent to backend server 302 for processing. In various embodiments, the taxi service may offer various incentives (e.g., discounts on a ride from the event or other ride) to customers to enter information about an event through application logic 218.

In a particular embodiment, a user may supply login credentials for a social network system (e.g., FACEBOOK) or other social media system (e.g., TWITTER) to the taxi service through application logic 218. The taxi service (e.g., through backend server) may then access the user's account on the social network system or other social media system and search for events and associated information accessible through the user's account. As another example, passenger application logic 218 may access the user's social media account directly and integrate information from the account with other functionality of the passenger application logic. For example, information about an event in a social network system may be displayed by passenger application logic 218 and the user may select an option to allow passenger application logic 218 to send information about the event to backend server 302.

In one embodiment, application logic 218 may cause the display of any suitable information relating to an event and allow a passenger to request transportation from the location of the event. In some embodiments, a determination may be made by application logic 218 and/or backend server 302 that the passenger will attend or is in attendance at an event. For example, a passenger may indicate (e.g., via application logic 218 or via a social network) the he is attending or plans to attend an event. As another example, the GPS coordinates of passenger mobile device 104 may be correlated with the location of an event. In various embodiments, notifications may be sent to passengers that are at or expected to attend an event via application logic 218 (such notification may be in response to a determination that the passenger is at or will be attending the event). For example, a notification that drivers will be available at the completion of the event may be provided to the passenger and the passenger may be provided with an interface allowing the passenger to request a ride from the event. As yet another example, a notification offering a discounted ride from the event may be provided to the user.

In various embodiments, the passenger may indicate via application logic 218 that the passenger desires taxi service upon completion of the event (e.g., after a concert is over or after a plane has arrived). In particular embodiments, if the passenger desires to leave the event early (e.g., to avoid crowds), the passenger may indicate such by specifying a time (e.g., an actual time or a time relative to completion of the event such as a number of minutes prior to completion of the event) at which the passenger desires taxi service. Upon receiving an indication that the passenger desires transportation from the event, application logic 218 may communicate the request to the backend system 116, and the backend system will direct a driver to the passenger at the appropriate time. This step will be described in further detail below.

In some embodiments, the passenger may indicate via application logic 218 whether the passenger is willing to accept group transportation (i.e., a taxi ride with one or more other passengers) from the event. For example, the passenger may indicate a preference to receive group transportation (as a default setting for all events or just for the particular event) or may indicate a willingness to accept group transportation if there is a shortage of drivers and/or a wait time for a car is greater than a particular threshold.

In various embodiments, application logic 218 may guide the user to a pickup location associated with the event. For example, application logic 218 may direct (e.g., using visual or audio instructions) the passenger to a convenient pickup location outside of an arena, airport, or other event location. As another example, application logic 218 may display various pickup locations near the event location and allow the passenger to select a pickup location. As yet another example, at the arranged time, the passenger's real time location (e.g., as determined by GPS) may be used as the pickup location.

Social network application logic 222 may provide a user interface to allow a passenger to interact with (e.g., enter and transmit information to and view information received from) a social network system. A social network system may store a record (i.e., a user profile) for each user of the system. The user profile may include any suitable information about the user, such as contact information, employment information, demographic information, personal interests, user-generated content, or other suitable information. The social network system may also store a record of the user's relationship with other users of the social network system. For example, such information may be stored as a social graph, wherein users (e.g., individuals, groups, business entities, organizations, etc.) may be represented as nodes in the graph and the nodes may be connected based on relationships between the users. A social network system may provide various services (e.g., photo sharing, wall posts, messaging, games, or advertisements) facilitating interaction between the users.

In a particular embodiment, a social network system allows users to create events, invite others to events, and to indicate attendance at such events. A record for an event stored by the social network system may include any suitable information, such as the name of the event, the type of event, the time and date of the event, the location of the event, a record of users that were invited to the event as well as an indication of whether the users have accepted, declined, or not yet responded to the invitation, or other suitable information about the event.

In various embodiments, the social network system may interact with passenger application logic 218 or backend server 302 to enhance the functionality of these components. As an example, events created in the social network system may be provided to the backend server 302 through an API or other interface to a data store of the social network system. In one embodiment, the social network system may allow backend server 302 to access events independent of a user login associated with a passenger or driver. For example, the social network system may have an arrangement with the taxi service to provide events created in the social network system to the taxi service. In another embodiment, backend server 302 may access the events visible by the taxi service's administrators, passengers, and/or drivers via their respective login credentials to the social network system.

In various embodiments, the social network system may provide any of the functionality listed above with respect to passenger application logic 218 in allowing a user to request a ride from an event and may relay received requests for rides to backend server 302 along with any suitable identifying information about the user to facilitate pickup by a driver. In one embodiment, information associated with requesting a ride from the event may be provided on an event page (e.g., a page that displays the details of the event) viewed by the user using social network application logic 222, a network browser, or other means. The information associated with requesting a ride may include instructions to or an interface (e.g., a link) to request a ride through the social network system, instructions to or a link to download passenger application logic 218 in order to request a ride, an advertisement about the taxi service along with an indication that the taxi service may provide a ride from the event, a coupon for a discounted ride from the event, or other suitable information facilitating the request of a ride from a user (who may or may not already be a customer of the taxi service). In another embodiment, information associated with requesting a ride may be sent to the user by the social network system through the social network application logic 222 (e.g., via a push notification) or other means (e.g., email, text messaging). In various embodiments, the information associated with requesting a ride from the event is provided to the user in response to a determination that the user is at the event.

In various embodiments of the present disclosure, in addition to any combination of the features described above with respect to the taxi driver application, application logic 220 may provide additional features for the taxi driver application to enhance a driver's experience. For example, driver application logic 220 may display one or more events and associated information such as the estimated completion time of the events. Such information may allow drivers to plan around events that are likely to produce passenger requests. Driver application logic 220 may navigate drivers to events such that the drivers arrive at the events at a time in which passengers are likely to need transportation (e.g., at the completion of the event).

In various embodiments, application logic 220 may provide drivers with the ability to indicate the occurrence of an event, whether the driver will attend an event, and any other information associated with an event. The application logic 218 may allow a user to enter any suitable information associated with an event, such as a date and time of the event, a location of the event, an expected attendance at the event, an estimated end time of the event, or other suitable information. This information may be sent to backend server 302 for processing. In various embodiments, the taxi service may offer various incentives (e.g., increased commission on one or more rides) to drivers to enter information about an event through application logic 220.

Figure 3:
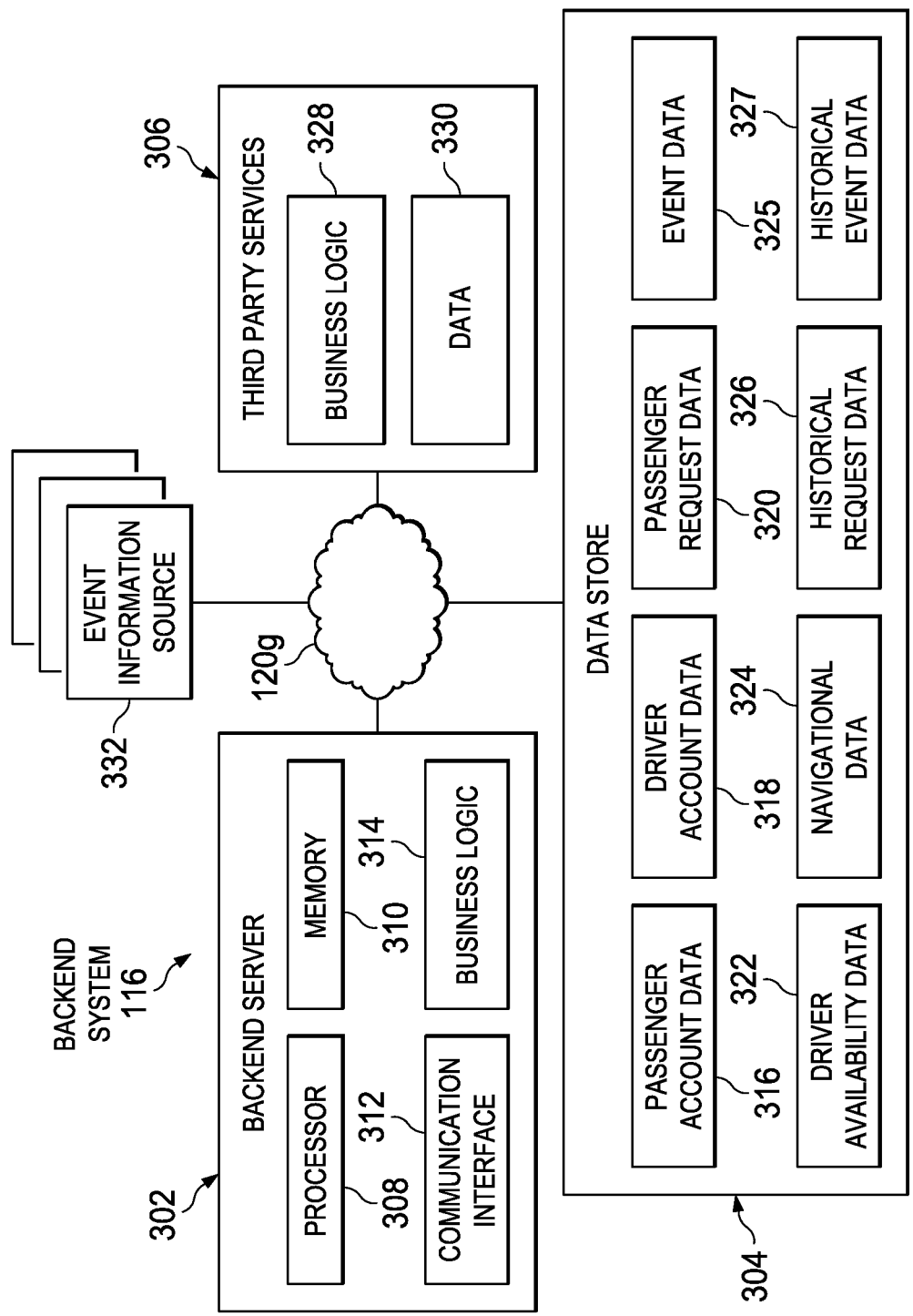
FIG. 3 illustrates a block diagram of a backend system of the system of FIG. 1 in accordance with certain embodiments.

FIG. 3 illustrates a block diagram of a backend system 116 of the system of FIG. 1 in accordance with certain embodiments. Although FIG. 3 depicts a particular implementation of the backend system 116, the backend system may include any suitable devices to facilitate the operation of the taxi service described herein. In the embodiment depicted, backend system includes backend server 302, data store 304, third party services 306, and event information sources 332 coupled together by network 120g. In various embodiments, backend server 302, data store 304, third party services 306, and/or event information sources 332 may each comprise one or more physical devices (e.g., servers or other computing devices) providing the functionality described herein. In some embodiments, one or more of backend server 302, data store 304, third party services 306, and event information sources 332 (or portions thereof) are deployed using a cloud service and may comprise one or more virtual machines or containers.

In the embodiment depicted, backend server 302 include a computer system to facilitate performance of its operations. As an example, backend server 302 includes one or more processors 308, memory elements 310, and communication interfaces 312, among other hardware and software. These components may work together in order to provide backend server functionality described herein. Processor 308 may have any suitable characteristics of the processors 202 and 204 described above. In particular embodiments, backend server 302 may utilize multiple processors to perform the functions described herein. In various embodiments, reference to a processor may refer to multiple discrete processors communicatively coupled together.

Similarly, memory 310 may have any suitable characteristics of memories 206 and 208 described above. Memory 310 may store any suitable data or information utilized by backend server 302, including software embedded in a computer readable medium, and/or encoded logic incorporated in hardware or otherwise stored (e.g., firmware). Memory 310 may also store the results and/or intermediate results of the various calculations and determinations performed by processor 308.

Communication interface 312 may also have any suitable characteristics of communication interfaces 214 and 216 described above. Communication interfaces 312 may be used for the communication of signaling and/or data between backend server 302 and one or more networks (e.g., networks 120) and/or network nodes (e.g., mobile devices 104 and 108, data store 304, third party services 306, event information sources 332, and application server 112) coupled to a network or other communication channel.

Business logic 314 may have any suitable characteristics of application logic 218 and 220 described above. Business logic 314 may include logic providing, at least in part, the functionality of the backend server described herein. In a particular embodiment, business logic 314 may include software that is executed by processor 308. However, in other embodiments, business logic 314 may take other forms such as those described above with respect to application logic 218 and 220.

Backend server 302 may communicate with data store 304 to initiate storage and retrieval of data related to the taxi service. Data store 304, may store any suitable data associated with the taxi service in any suitable format(s). For example, data store 304 may include one or more database management systems (DBMS), such as SQL Server, Oracle, Sybase, IBM DB2, or NoSQL data bases (e.g., Redis and MongoDB).

In the embodiment depicted, data store 304 includes passenger account data 316, driver account data 318, passenger request data 320, driver availability data 322, navigational data 324, historical request data 326, event data 325, and historical event data 327. The various data may be updated at any suitable intervals.

Passenger account data 316 may include any suitable information associated with passenger accounts, such as contact information (e.g., real names and addresses), user names and passwords (or other authentication information), payment information (e.g., credit card or bank account numbers and associated information), passenger preferences (e.g., preferred type or color of car), ratings the passenger has given drivers, ratings the passenger has received from drivers, or other information associated with passenger profiles.

Driver account data 318 may include any suitable information associated with driver accounts, such as contact information (e.g., real names and addresses), user names and passwords (or other authentication information), payment collection information (e.g., bank account information), vehicle information (e.g., models and colors of cars the drivers utilize, maximum capacity of the cars of the drivers), merchandise offered by the drivers, whether the drivers are available to transport passengers, whether the drivers have opted for automatic acceptance of passenger requests (whereby the backend server 302 may assign a passenger request to the driver without waiting for the driver to indicate acceptance of a request), or other suitable information.

Passenger request data 320 may comprise pending requests (i.e., requests that have not yet been fulfilled) received from passengers. Each request may include any suitable information, such as any combination of one or more of an identification of the passenger making the request, the time the request was made, the current location of the passenger, the desired pick-up location, the desired pick-up time, the estimated time remaining until a driver can pick up the passenger, the actual pick-up time, the desired destination location of the passenger (which the passenger may or may not provide at the time the request is made), the type of vehicle requested, estimated fare for the trip, current accumulated fare for the trip, estimated time and mileage remaining in the trip, other information specified by the user (e.g., requested merchandise, requested minimum rating of driver), whether a driver has been assigned to a request, and which driver has been assigned to a request.

Driver availability data 322 may comprise information associated with drivers that are available to transport passengers. In some embodiments, driver availability data 322 may also comprise information associated with drivers that are not available to transport passengers (e.g., because they are off-duty or currently transporting a passenger). An entry in the driver availability data 322 may include an identification of a driver and any suitable associated information, such as one or more of a current location of the driver, whether the driver is available to transport passengers, whether the driver is currently transporting a passenger, a destination location of a current trip of the driver, an estimate of how long it will be before the driver finishes his current trip, whether the driver has opted for automatic acceptance of passenger requests, or other suitable information.

Navigational data 324 may comprise information supporting navigation functions provided by the taxi passenger applications and driver passenger applications. For example, navigational data 324 may comprise map data that may be sent to passenger mobile devices 104 and driver mobile devices 108 to allow the devices to display maps and associated indicators (e.g., location of passenger(s), location of driver(s), desired routes, etc.) In some embodiments, the navigational data may also comprise information indicative of the amount of time required to travel between various locations. In some embodiments, navigational data 324 may comprise historic and/or real time data about the flow of traffic in particular areas enabling backend server 302 to calculate an estimated time required to travel from one location to another.

Historical request data 326 may comprise information about completed requests. In some embodiments, historical request data 326 may also include information about canceled requests. The information for each request may include any combination of the information listed above with respect to requests stored in the passenger request data 320 as well as any combination of additional data such as the time at which the destination location was reached, the total time of the trip, the total fare, a rating given by the passenger to the driver or by the driver to the passenger for the trip, or other suitable information associated with the trip.

Event data 325 may comprise information about upcoming events, currently occurring events, and recently ended events (e.g., before information about the events is transferred to historical event data 327). An entry in event data 325 may include any suitable information about the event, such as a title of the event, a location of the event (which may be expressed in any suitable manner, such as GPS or other coordinates, an address, or a name of the venue at which the event is held), an estimated end time of the event, passenger pickup locations associated with the event (e.g., one or more ideal locations for drivers to pick up passengers that attended the event), an estimation of the number of people attending the event, an indication of the type of the event (e.g., a baseball game, a concert, an airplane arrival), or other suitable information. An entry in event data 325 may include a tracking of and/or an estimate of passenger requests for transportation from passengers that will be or are attending the event. For example, an entry may include an estimation of the aggregate number of passenger requests that will be and/or have been received from passengers at the event and/or a predicted timeline of how many requests have been and/or will be received as a function of time relative to the completion of the event (e.g., an average number of requests per minute received prior to and after the end of the event). In some embodiments, an indication of each passenger request made in association with the event may be stored. Whether a passenger request is associated with the event may be determined in any suitable manner, such as by filtering requests based on a temporal and geographical proximity with the event.

Historical event data 327 may include information about past events that may be used by backend server to determine the number of passenger requests and/or estimated completion times for events stored in event data 325. An entry in historical event data 327 for a past event may include any suitable information, such as that described above in connection with an entry in event data 325.

In various embodiments, backend server 302 may access third party services 306 through business logic 328 to access data 330. Third party services 306 may represent any suitable number of devices operated by any suitable number of third parties that are distinct from an entity that operates the backend system 116 and/or data store 304. For example, in some embodiments the navigational data may be obtained from a third party service 306 rather than data store 304, or additional third party navigational data such as map data or historical and/or current traffic flow information may be used to supplement navigational data 324. As another example, third party services 306 may authenticate users on behalf of the backend server 302 (e.g., through an account of the user with the third party). Business logic 328 may comprise any suitable logic operable to receive requests for data from backend system 116 and/or mobile devices 104 and 108 and provide responses to the requests.

Backend server 302 may be in communication with each passenger mobile device 104 and each driver mobile device 108 that is utilizing the taxi service at a particular time. Backend server may store information received from the mobile devices 104 and 108 in data store 304. Backend server 302 may also receive and respond to requests made by mobile devices 104 and 108 by processing information retrieved from data store 304.

When a passenger opens the taxi passenger application, the backend server 302 may log the passenger in based on a comparison of authentication information provided by the passenger mobile device 104 with authentication information stored in passenger account data 316. The passenger may then request a ride. The request is received by the backend server 302 and stored in passenger request data 320. Backend server 302 may access driver availability data 322 to determine one or more drivers that would be suitable to fulfill the request from the passenger. In one embodiment, backend server 302 selects a particular driver (e.g., based on the driver's locality with respect to the passenger's pick-up location) and sends information associated with the request to the driver. The driver indicates whether he accepts or rejects the request via his mobile device 108. If the driver rejects the request, backend server 302 selects a different driver and the process is repeated until the backend server 302 receives an accepted request from a driver. In another embodiment, backend server 302 may select a plurality of drivers that may fulfill a passenger's request and allow the passenger to select one of the drivers. The backend server 302 may proceed to notify the driver of the request in a similar manner to that described above. In yet another embodiment, backend server 302 may select a plurality of drivers that may fulfill a passenger's request and notify each driver of the passenger's request. The backend server 302 may then allocate the request to one of the drivers based on any suitable criteria. For example, the driver who is the first to accept the request may be assigned to the request. As another example, if multiple drivers accept the request within a given timeframe, the request may be assigned to the most suitable driver (e.g., the driver that is closest to the pick-up location or a driver that has a car that meets preferred characteristics of the passenger's request).

Once the request has been accepted by a driver, the backend server 302 notifies the passenger that a driver has accepted his request and provides any suitable information associated with the driver (e.g., driver's current location, model and color of vehicle, estimated time of arrival, etc.) to the passenger.

The backend server 302 may provide navigation information to the driver mobile device 108 to direct the driver to the passenger's pickup location and subsequently to direct the driver to the passenger's destination location. The backend server 302 may also provide real-time updates associated with the trip to both the passenger and the driver.

Once the passenger's destination location has been reached, the backend server 302 may facilitate payment of the fare for the trip using payment information stored in passenger account data 316 and/or driver account data 318 (or information supplied by the passenger at the time of the transaction). The backend server 302 may also receive ratings associated with the trip for the passenger and driver and store these ratings in data store 304.

Backend server 302 may preemptively navigate drivers to events in order to service passenger requests at the events by identifying events, estimating a completion time of the event, estimating a number of passenger requests, and navigating drivers to the event based on this information.

Backend server 302 may identify events in any suitable manner. For example, in the embodiment depicted, backend server 302 may connect to event information sources 332 through one or more networks 120*g*. An event information source 332 may include any source containing information about an event. For example, an event information source 332 may be a server hosting a webpage containing event information, a server providing an API through which backend server 302 may request event information from the server, a server providing access to a file (e.g., a calendar file such as an iCalendar or vCalendar file) containing information about one or more events, a computing device which may be used by an administrator to manually enter event information, information obtained from a passenger or driver mobile device, or other suitable source. In an embodiment, an event information source 332 includes a social network system. In some embodiments, event information may be uploaded directly to backend server 302 via a flash drive or other means. In one embodiment, backend server 302 may access various websites and parse the data included in the websites to obtain the event information. The event information obtained from one or more event information sources 332 may include any suitable information about an event, such as one or more data items described above in connection with the data stored in event data 325 and historical event data 327, such as an event title, location, estimated end time, expected attendance, or other information associated with the event.

Backend server 302 may obtain the event information and store it in memory 310 and/or data store 304. The event information may describe any suitable events. An event may comprise a gathering of a plurality of people for any suitable purpose. Examples of events include concerts, sporting events (e.g., baseball, football, soccer, basketball, hockey, boxing, or other sports), parades, airplane arrivals, community gatherings, or other suitable gatherings. Events identified by the backend server 302 may be events in which a plurality of passengers are likely to request transportation from the taxi service upon completion of the event.

In various embodiments, backend server 302 may classify an event based on the information received from one or more event information sources 332 to facilitate comparison with historical events stored in historical event data 327. The classification may be based on the source of the event information, key words included in the event information, manual entry of the classification, or other suitable information. As just one example, particular events obtained from a basketball team's website may be classified as basketball games for the particular team. Backend server may analyze historical events with similar classifications in order to determine patterns in end times and/or passenger requests in order to more accurately predict the same for upcoming or ongoing events.

In various embodiments, backend server 302 may determine or estimate a completion time for the event. In particular embodiments, backend server 302 may identify the completion time from information provided by the event information source 332 (e.g., the end time or the duration of the event may be specified by the event information source). In some embodiments, the end time of an event may be estimated based on end times associated with past events of the same type stored in historical event data 327. In some embodiments, backend server 302 may update the estimated end time of an event one or more times during the event (e.g., periodically during the event). For example, backend server 302 may connect to the event information source 332 to determine how much time is left until the event is over. As various examples, sport websites may include information indicating how far a game has progressed or an airport website may indicate an expected arrival time for a particular flight.

In particular embodiments, backend server 302 may estimate that an event is over or nearing completion based on a relatively large amount (e.g., a threshold number of requests for a given amount of time may be exceeded) of passenger requests received in a particular period of time (e.g., from people leaving the event early). In some embodiments, such estimation may be based on the timeline of passenger requests associated with past events in historical event data 327. In some embodiments, backend server 302 may verify that an event is complete by communicating with event information source 332 or by other means.

The number of expected passenger requests may be determined in any suitable manner. For example, backend server 302 may determine an expected number of passengers based on any suitable factors such as the expected total attendance at the event (e.g., as indicated by event information source 332 or as derived from similar past events stored in historical event data 327), the percentage of the population (e.g., in a particular region including the location of the event) that utilize the taxi service, a number of passengers detected as attending the event (e.g., based on GPS coordinates received from passenger mobile devices), the location of the event (some locations may result in a higher rate of taxi requests than others), the time of the event, past passenger requests from similar events (e.g., as stored in historical request data 326 and/or historical event data 327), and/or other suitable factors. In one embodiment, the expected total attendance at the event may be based on a number of users of a social network that have indicated an intent to attend the event. In some embodiments, if the number of expected passenger requests for an event is not above a particular threshold, backend server 302 may determine not to store event information associated with the event and would service passenger requests in a default manner (i.e., the backend server would wait to dispatch drivers to the event location until after passenger requests are received).

In various embodiments, backend server 302 may attempt to verify the occurrence of an event from multiple sources before storing the event information in event data 325. For example, backend server 302 may examine multiple different websites to ensure that information obtained about an event is consistent before storing the event information in event data 325. As another example, backend server 302 may require multiple passengers and/or drivers to enter information associated with an event and/or confirm an intent to attend an event (e.g., through application logic 218 or 220 or social network application logic 222 or 224) before storing the event information in event data 325.

In various embodiments, backend server 302 may determine an aggregate number of expected passenger requests to be received upon completion of the event. Alternatively or in addition, backend server 302 may determine how many passenger requests are expected as a function of time. For example, backend server 302 may estimate the average number of requests that will be received per minute for a predetermined time before the estimated completion of the event and for a predetermined time after the estimated completion of the event.

In various embodiments, backend server 302 may navigate drivers to the location of the event based on the expected number of passengers. In one embodiment, backend server 302 calculates the aggregate number of expected passenger requests to be received upon completion of the event and begins navigating drivers to the location of the event prior to the completion of the event. The backend server 302 may aim to navigate drivers to the event so that the drivers arrive at the event at the same time the event ends or a predetermined amount of time prior to or after the event ends. The time selected for the drivers to arrive may be based on passenger requests from previous events or other suitable information.

Additionally or alternatively, passenger requests may be estimated as a function of time. For example, it is common for attendees of a sporting event to leave the event early to avoid crowds. Thus, backend server 302 may progressively direct drivers to an event location based on the estimated end time of the event and an estimate of when a critical mass of passenger requests will be received. The backend server 302 may calculate an expected number of passenger requests for one or more times prior to the completion of the event and may direct drivers to the event location based on this calculation. The backend server 302 may use information from past events, current passenger requests from the event location, and current availability of drivers in performing one or more of these calculations. For example, if 10 passenger requests are expected for each 5 minute interval prior to completion of an event but only 5 passenger requests were received during the first interval, backend server 302 may adjust the number of expected passengers for future intervals and/or may send less drivers to the event location for future intervals.

For a particular driver, the navigation may begin at a time based upon the driver's expected travel time to the location of the event and a time at which the driver is needed at the event. For example, if an event is expected to finish at 9:00 PM and the driver is 15 minutes away, the navigation may begin at or around 8:45 PM. As another example, if the driver has been selected to arrive at the event 15 minutes early (e.g., to pick up someone leaving the event early), then the navigation may begin at or around 8:30 PM. When multiple drivers are navigated to the event to arrive at a particular time, the starting times of the navigation may differ from driver to driver.

The backend server may track the number of drivers that are en route to the event location (or already at the event location) and request that additional drivers travel to the event location if the number of drivers available (e.g., at the event location or en route to the event location) is not expected to meet the demand of passenger requests.

In some embodiments, backend server 302 may access data indicating convenient pickup locations around the event location and may direct the drivers to these locations to wait for passenger requests. This data may be obtained in any suitable manner, such as a manual entry by an administrator or an analysis of pickup locations used during past similar events. In some embodiments, when a passenger request is received from a passenger at the event location, the backend server 302 may instruct application logic 218 of passenger mobile device 104 to direct the passenger to the location at which the driver has been instructed to wait. In various embodiments, backend server 302 may optimize the placement of drivers around the event location in order to efficiently pair passengers and drivers. For example, if backend server 302 is navigating multiple drivers to the event location in anticipation of receiving passenger requests at the event location, backend server 302 may distribute the drivers among locations that are spaced out around the event location (e.g., drivers may be spaced out among northwest, southwest, northeast, and southeast corners of an arena).

In various embodiments, when a passenger request is received and is not able to be fulfilled immediately because of a shortage of drivers, backup server 302 may calculate an expected wait time and send the wait time to the passenger mobile device 104. In one example, if the demand for drivers is greater than the supply of drivers, passenger requests may be placed in a queue. The placement of the passenger request in the queue may be based on any suitable factors, such as the time the request is received (with preference given to earlier requests), the amount the passenger is willing to pay for the ride, the distance of the passengers ride (e.g., passengers with shorter distances may be placed higher in the queue if it is likely the driver would be able to complete the request and return to the event location for another passenger), a status of the passenger with respect to the taxi company (e.g., preference may be given to passengers with a greater number of rides taken using the service), or other factors. For a given passenger, the wait time may be based on the position of the passenger in the queue as well as the status (e.g., distance from the event location) of one or more drivers servicing the event. For example, drivers may be paired with passenger requests in accordance with their expected availability to arrive at the event location and the wait time may be based on the amount of time it will take the driver paired with the passenger request to arrive at the event location. As another example, an estimate may be made based on an average number of drivers arriving at the event location per minute or other unit of time.

In particular embodiments, backup server 302 may arrange for group rides wherein a driver transports multiple passengers from the event location to their respective destinations. In various embodiments, backup server 302 may arrange for group rides if users that form a suitable group have requested group rides or if the supply of drivers does not suitably meet the actual or projected demand for drivers. Whether the supply of drivers meets the demand may be determined in any suitable manner. For example, a wait time (or average wait time) for one or more passenger requests may exceed a threshold. As another example, the size of the queue may exceed a threshold. As another example, a projected demand for drivers may exceed a projected supply of drivers at one or more points of time in the future. Once it is determined that the supply of drivers does not meet the demand for drivers, a group ride may be offered to one or more passengers or the passengers may be queried to see if they are willing to accept a group ride.

A passenger may indicate whether the passenger is willing to share a ride along with other parameters associated with sharing the ride. For example, the passenger may specify the maximum length of deviation from the event location to the passenger's destination in terms of miles or time that the passenger is willing to tolerate. As another example, the passenger may specify the maximum number of passengers he is willing to share a ride with.

When querying whether a passenger is willing to share a ride, the backend server 302 may communicate a discounted price of the shared ride to the passenger. The discounted price may be based on any suitable factors, such as the standard price for the passenger's request, the current supply of drivers with respect to the demand for drivers, the inconvenience to the passenger (e.g., as measured by the length in time or distance of the expected detour or the number of additional passengers), the status of the passenger with the taxi service, or other suitable factors.

In various embodiments, backend server 302 may select prospective passengers to be presented with an offer for a group ride based on any suitable factors, such as their place in the queue, the proximity of their respective destination locations, their indicated preference for group rides, or other factors. In one embodiment, if a passenger's destination location is relatively close to the event location, backend server 302 may choose to forego the offering of a group ride to the passenger, as the passenger's request might be fulfilled quickly, allowing the driver to return to the event quickly and transport additional passengers. Of course, if the backend server 302 locates additional passengers that live near the passenger, the backend server 302 may instead choose to offer a group ride.

In an embodiment, the number of group ride offers that are presented to passengers is based on the difference between the supply of drivers and the demand for drivers. For example, once equilibrium is reached, the backend server 302 may cease the offering of group rides or may become more selective in offering group rides.

The group rides may be constructed in any suitable manner. In some embodiments, a route for a group ride is not constructed until each passenger in the route has expressed their willingness to participate in a group ride. In other embodiments, a route for a group ride may be constructed before asking for the passenger's willingness to participate in a group ride. In any event, after constructing the route, the backend server 302 may send information associated with the group ride to the passengers for approval. In various embodiments, information associated with the group ride may include the route up to the passenger's destination location (or the entire route), the expected detour length, the expected arrival time at the passenger's destination location, the number of passengers that the group ride will be shared with, the size of the vehicle selected to service the group ride, or other information associated with the group ride. If a particular passenger declines the group ride at that point, backend server 302 may attempt to find a suitable replacement for the passenger, update the information associated with the group ride, and resend to one or more of the passengers for approval. If the replacement does not material affect particular passengers, then consent from those passengers does not need to be received before initiating the group ride. For example, a passenger that is the second stop out of three stops would not affect the passenger with the first stop. As another example, if the substitution of a passenger would not change the arrival time for a particular passenger by more than a predetermined threshold, then consent need not be sought from the particular passenger.

In a particular embodiment, a group ride may be constructed sequentially. That is, approval for the group ride may be obtained from a first passenger that will be the first passenger dropped off on the group ride. Subsequently, backend server 302 may attempt to locate (and receive approval from) a second passenger that will be the second passenger dropped off on the group ride, and so on.

Once a group ride is constructed and approval from each passenger is obtained, backend server 302 may facilitate the pairing of the group ride with a driver. Backend server 302 may also notify each passenger of a central meeting spot in which to meet the driver (or may navigate the driver to each passenger separately).

In various embodiments, backend server 302 may communicate with a passenger mobile device 104 to determine that a passenger is at or will be attending an event and to allow the passenger to request a ride in connection with the event. In one example, backend server 302 may detect that the passenger mobile device 104 is at an event location (e.g., by matching up a location of the mobile device with a location of the event) and send a query to mobile device 104 asking if the passenger is attending the event. As another example, backend server 302 may provide a list of events to passenger mobile device 104 which may then receive a selection from a passenger as to an event the passenger is attending or will attend.

In various embodiments, a passenger mobile device 104 may receive input from a user indicating that the user would like a ride upon the completion of the event. Alternatively, the passenger mobile device 104 may schedule a ride for a time relative to the completion of the event. The passenger mobile device 104 may then communicate the request to backend server 302 which may store the request in passenger request data 320 and arrange for a driver to fulfill the request at the appropriate time.

In various embodiments, drivers' vehicles may be equipped with various features to allow passengers to easily identify their assigned driver. For example, a driver's vehicle may have a configurable sign in communication with driver mobile device 108 that displays information associated with the passenger request, such as the name of the passenger, the name of the driver, or other identifier associated with the passenger request (such as a confirmation number generated when the request is made).

Figure 4:
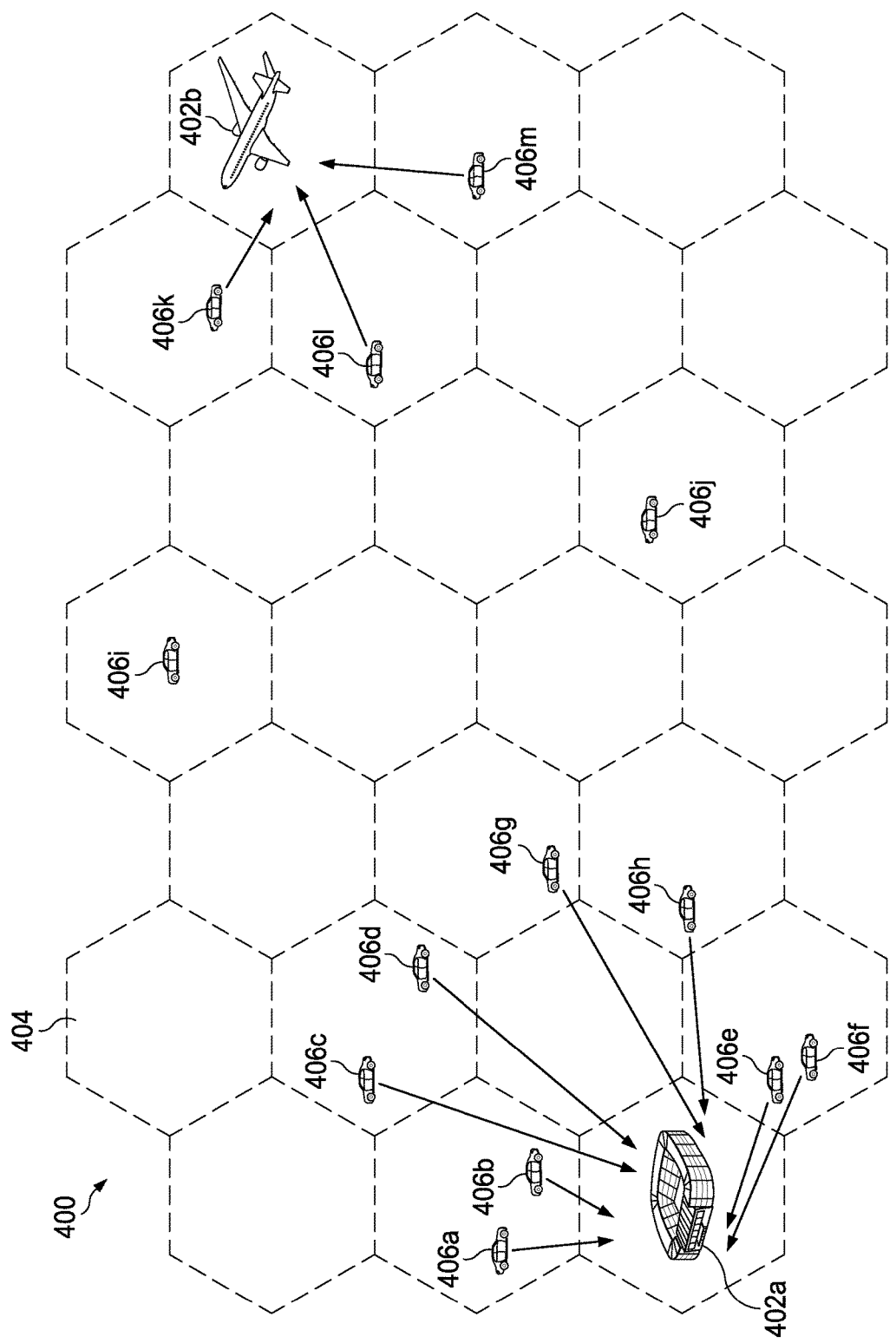
FIG. 4 illustrates a diagram of drivers being directed to various events in accordance with certain embodiments.

FIG. 4 illustrates a diagram of drivers being directed to various events in accordance with certain embodiments. Although the passenger pick-up regions 404 are depicted as hexagonal regions each having the same area, other embodiments may include passenger pick-up regions with any suitable geographical delineations. In the embodiment depicted, drivers 406 are located in various regions 404. Diagram 400 also depicts event locations 402a and 402b which are the sites of a football game and an arrival of an airplane.

Drivers 406 may be preemptively directed by the backend server 302 to various event locations such that the drivers may be waiting at the event locations when requests from passengers attending the events are received. In the embodiment depicted, drivers 406a-h are directed to wait in separate locations (e.g., the four corners of the football stadium) at the event location to facilitate efficient pairing of passenger requests with the drivers.

In various embodiments, drivers to be preemptively directed to an event may be selected based on their proximity to the event location. For example, in the embodiment depicted, drivers 406a-406h are directed to event location 402a, drivers 706k-m are directed to event location 402b, and drivers 406i and 406j are not directed to an event location.

As described above, the number of drivers directed to an event location may be based on an estimated passenger demand. Various factors may be used to determine whether any particular driver 406 is directed to an event location, such as the driver's proximity to the event location, whether the driver is currently transporting a passenger, the likelihood of the driver picking up a passenger in his current region 404 or other nearby region 404, or other suitable factors. When end times of multiple events occur near the same time and in geographical proximity to each other, backend server may select a subset of available drivers to be directed to a first event and a different subset of the available drivers to be directed to the second event.

Figure 5:
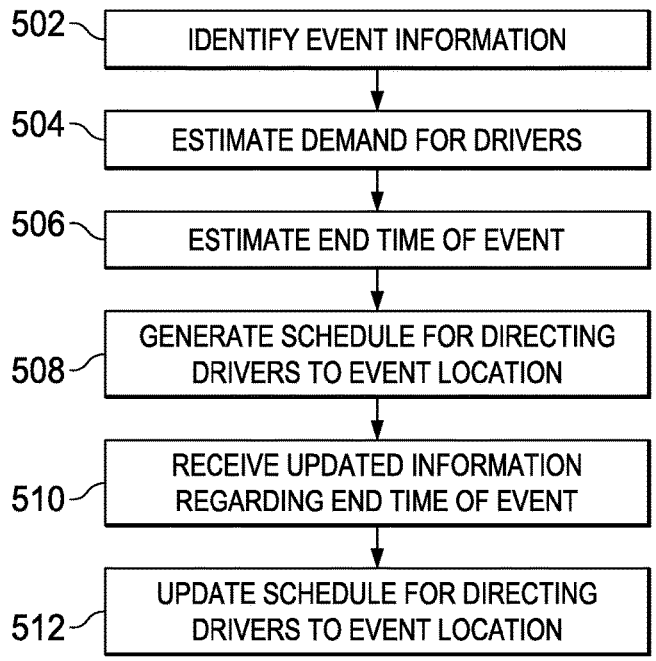
FIG. 5 illustrates a method for preemptively navigating drivers to passengers at an event in accordance with certain embodiments.

FIG. 5 illustrates a method for preemptively navigating drivers to passengers at an event in accordance with certain embodiments. At step 502, event information is identified in any suitable manner by any suitable entity as described above. At step 504, a demand for drivers is estimated, for example, based on historical data and/or current conditions associated with incoming passenger requests. At step 506, an end time of the event is estimated based on an end time specified in the event information, historical data, current conditions associated with incoming passenger requests, or other suitable information.

At step 508, a schedule for directing drivers to the event location is generated. The schedule may be based on the estimated demand for drivers and may be used by backend server 302 to direct drivers to the event location so that they will arrive prior to or concurrent with the arrival of passenger requests to be paired with the drivers. At step 510, updated information regarding the end time of the event may be received. At step 512, the schedule for directing drivers to the event location may be updated based on the updated estimated end time of the event. For example, if the estimated end time has changed, the schedule may cause backend server 302 to notify the drivers of the change and either move forward or push back the time at which backend server 302 begins directing the drivers to the event location.

Some of the steps illustrated in FIG. 5 may be repeated, combined, modified or deleted where appropriate, and additional steps may also be included. Additionally, steps may be performed in any suitable order or concurrently without departing from the scope of particular embodiments.

Figure 6:
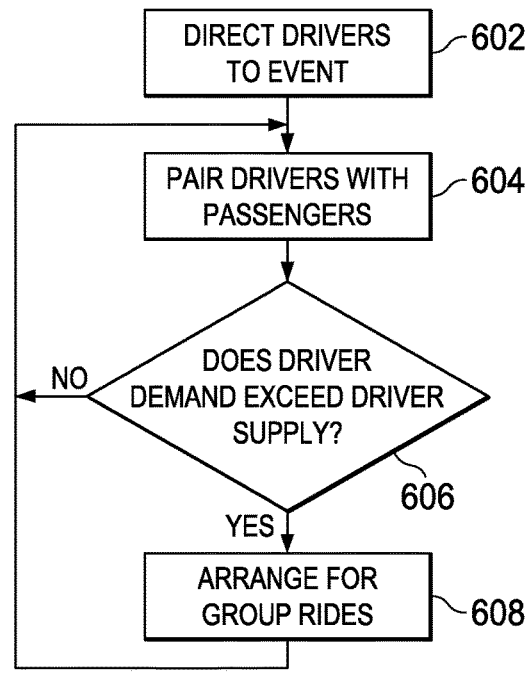
FIG. 6 illustrates a method for offering a group ride to passengers at an event in accordance with certain embodiments.

FIG. 6 illustrates a method for offering a group ride to passengers at an event in accordance with certain embodiments. At step 602, drivers are directed to an event. For example, the drivers may be directed to the event to pick up passengers upon the completion of the event. At step 604, drivers are paired with passengers. A passenger may submit a passenger request which may be sent to a driver. The driver may accept the request and backend server 302 may facilitate the fulfillment of the request by the driver.

At step 606, it is determined whether driver demand exceeds driver supply. If it does not, then the method returns to step 604 where drivers are paired with individual passenger requests. If driver demand does exceed driver supply, then backend server 302 may arrange for group rides wherein multiple passenger requests are aggregated, a route based on the requests is constructed, and a single driver fulfills the passenger requests.

Meanwhile the backend server 302 may continue pairing drivers with passengers at step 604 and determining whether the driver demand exceeds the driver supply at step 606. If the driver demand no longer exceeds the driver supply, then group rides are no longer necessary (though group rides may be constructed in response to specific passenger requests).

Some of the steps illustrated in FIG. 6 may be repeated, combined, modified or deleted where appropriate, and additional steps may also be included. Additionally, steps may be performed in any suitable order or concurrently without departing from the scope of particular embodiments.

It is also important to note that the steps in FIGS. 5 and 6 illustrate only some of the possible scenarios that may be executed by, or within, the various components of the system described herein. Some of these steps may be deleted or removed where appropriate, or these steps may be modified or changed considerably without departing from the scope of the present disclosure. In addition, a number of these operations may have been described as being executed concurrently with, or in parallel to, one or more additional operations. However, the timing of these operations may be altered considerably. The preceding operational flows have been offered for purposes of example and discussion.

The functionality described herein may also be performed by any suitable component of the system. For example, certain functionality described herein as being performed by backend server 116, may, in various embodiments, be performed by any combination of one or more passenger mobile devices 104 or driver mobile devices 108 where appropriate. Similarly, certain functionality described herein as being performed by a passenger mobile device 104 or a driver mobile device 108 may, in various embodiments, be performed by backend server 116 where appropriate.

In a particular embodiment, a method comprises identifying, by a server comprising at least one processor, an event likely to be attended by a plurality of users of a taxi service; determining, by the server, a location of the event; estimating, by the server, an end time of the event; and prior to the end time of the event, directing a plurality of drivers associated with the taxi service to drive to the location of the event to transport passengers from the location of the event.

In various embodiments, the method may further comprise determining, by the server, an expected demand for drivers of the taxi service to transport passengers from the location of the event; and the plurality of drivers directed to drive to the location of the event may be selected in accordance with the expected demand for drivers. The method may further comprise accessing a database comprising historical data indicating passenger requests received by the server in association with one or more previous events and basing the expected demand for drivers at least in part on the historical data. The method may further comprise parsing data from one or more websites to identify the event and the location of the event. The method may further comprise directing a first set of the plurality of drivers to arrive at the location of the event at a first time and a second set of the plurality of drivers to arrive at the location of the event at a second time. The first time and the second time may be based at least in part on historical data indicating passenger requests received by the server as a function of time in association with one or more previous events. The method may further comprise accessing a database comprising historical data indicating durations of events similar to the event and estimating the end time based at least in part on the historical data. The end time may be estimated based at least in part on an amount of requests received from passengers attending the event.

In a particular embodiment, an apparatus comprises a communication interface; and at least one processor to identify an event likely to be attended by a plurality of users of a taxi service; determine a location of the event; estimate an end time of the event; and prior to the end time of the event, direct a plurality of drivers associated with the taxi service to drive to the location of the event to transport passengers from the location of the event.

In various embodiments, the at least one processor may further determine an expected demand for drivers of the taxi service to transport passengers from the location of the event; and the plurality of drivers directed to drive to the location of the event may be selected in accordance with the expected demand for drivers. The at least one processor is further to access a database comprising historical data indicating passenger requests received by a server in association with one or more previous events and base the expected demand for drivers at least in part on the historical data. The at least one processor is further to parse data from one or more websites to identify the event and the location of the event. The at least one processor is further to direct a first set of the plurality of drivers to arrive at the location of the event at a first time and a second set of the plurality of drivers to arrive at the location of the event at a second time. The first time and the second time are based at least in part on historical data indicating passenger requests received by a server as a function of time in association with one or more previous events. The at least one processor is further to access a database comprising historical data indicating durations of events similar to the event and determine the end time based at least in part on the historical data. The end time is estimated based at least in part on an amount of requests received from passengers attending the event.

In a particular embodiment, at least one computer-readable non-transitory media comprises one or more instructions that when executed by at least one processor configure the at least one processor to cause the performance of operations comprising identifying an event likely to be attended by a plurality of users of a taxi service; determining a location of the event; estimating an end time of the event; and prior to the end time of the event, directing a plurality of drivers associated with the taxi service to drive to the location of the event to transport passengers from the location of the event.

In various embodiments, the instructions when executed are further to cause the performance of determining an expected demand for drivers of the taxi service to transport passengers from the location of the event; and wherein the plurality of drivers directed to drive to the location of the event are selected in accordance with the expected demand for drivers. The instructions when executed are further to cause the performance of accessing a database comprising historical data indicating passenger requests received by a server in association with one or more previous events and basing the expected demand for drivers at least in part on the historical data. The instructions when executed are further to cause the performance of accessing a database comprising historical data indicating durations of events similar to the event and estimating the end time based at least in part on the historical data.

In a particular embodiment, a method comprises accessing a social network system; identifying, based on information stored by the social network system, an event likely to be attended by a plurality of prospective passengers; and directing, by a server comprising at least one processor, a plurality of drivers associated with the taxi service to drive to the location of the event to transport passengers from the location of the event.

In various embodiments, the method further comprises determining an expected demand for drivers of the taxi service to transport passengers from the location of the event based on the information stored by the social network system. The plurality of drivers directed to drive to the location of the event are selected in accordance with the expected demand for drivers. The information stored by the social network system upon which the identification of the event is based comprises an event page created by a user of the social network system. The method further comprises communicating information associated with the taxi service to the social network system for display in association with an event page of the social network system for the event. The information associated with the taxi service comprises a promotional offer for transportation from the location of the event. The server accesses the social network system by using login credentials of a user registered with the taxi service.

In a particular embodiment, an apparatus comprises a communication interface; and at least one processor to access a social network system; identify, based on information stored by the social network system, an event likely to be attended by a plurality of prospective passengers; and direct a plurality of drivers associated with the taxi service to drive to the location of the event to transport passengers from the location of the event.

In various embodiments, the at least one processor is further to determine an expected demand for drivers of the taxi service to transport passengers from the location of the event based on the information stored by the social network system. The plurality of drivers directed to drive to the location of the event are selected in accordance with the expected demand for drivers. The information stored by the social network system upon which the identification of the event is based comprises an event page created by a user of the social network system. The at least one processor is further to communicate information associated with the taxi service to the social network system for display in association with an event page of the social network system for the event. The information associated with the taxi service comprises a promotional offer for transportation from the location of the event. The at least one processor accesses the social network system by using login credentials of a user registered with the taxi service.

In a particular embodiment, at least one computer-readable non-transitory media comprises one or more instructions that when executed by at least one processor configure the at least one processor to cause the performance of operations comprising access a social network system; identify, based on information stored by the social network system, an event likely to be attended by a plurality of prospective passengers; and direct a plurality of drivers associated with the taxi service to drive to the location of the event to transport passengers from the location of the event.

In various embodiments, the instructions when executed further cause the determination of an expected demand for drivers of the taxi service to transport passengers from the location of the event based on the information stored by the social network system. The plurality of drivers directed to drive to the location of the event are selected in accordance with the expected demand for drivers. The information stored by the social network system upon which the identification of the event is based comprises an event page created by a user of the social network system. The instructions when executed further cause the communication of information associated with the taxi service to the social network system for display in association with an event page of the social network system for the event. The information associated with the taxi service comprises a promotional offer for transportation from the location of the event.

In a particular embodiment, a method comprises determining in association with an event attended by a plurality of prospective passengers whether a demand for drivers of a taxi service is greater than a supply of available drivers; and in response to a determination that the demand for drivers is greater than the supply of available drivers, sending a group ride offer to a plurality of mobile computing devices of users of the taxi service.

In various embodiments, the determination that the demand for drivers is greater than the supply of available drivers is based on an expected wait time to fulfill one or more passenger requests from one or more users of the taxi service. The group ride offer is to indicate at least one discounted price for one or more users that receive the group ride offer. The group ride offer includes an indication of an expected detour for at least one user that receives the group ride offer. The determination that the demand for drivers is greater than the supply of available drivers is based on a current demand for drivers. The determination that the demand for drivers is greater than the supply of available drivers is based on an expected future demand for drivers. The method further comprises constructing a route for a driver of the taxi service based on the group ride offer and communicating the route to a mobile computing device of the driver.

In a particular embodiment, an apparatus comprises a communication interface; and at least one processor to determine in association with an event attended by a plurality of prospective passengers whether a demand for drivers of a taxi service is greater than a supply of available drivers; and in response to a determination that the demand for drivers is greater than the supply of available drivers, sending a group ride offer to a plurality of mobile computing devices of users of the taxi service.

In various embodiments, the determination that the demand for drivers is greater than the supply of available drivers is based on an expected wait time to fulfill one or more passenger requests from one or more users of the taxi service. The group ride offer is to indicate at least one discounted price for one or more users that receive the group ride offer. The group ride offer includes an indication of an expected detour for at least one user that receives the group ride offer. The determination that the demand for drivers is greater than the supply of available drivers is based on a current demand for drivers. The determination that the demand for drivers is greater than the supply of available drivers is based on an expected future demand for drivers. The at least one processor further to construct a route for a driver of the taxi service based on the group ride offer and communicate the route to a mobile computing device of the driver.

In a particular embodiment, at least one computer-readable non-transitory media comprises one or more instructions that when executed by at least one processor configure the at least one processor to cause the performance of operations comprising determine in association with an event attended by a plurality of prospective passengers whether a demand for drivers of a taxi service is greater than a supply of available drivers; and in response to a determination that the demand for drivers is greater than the supply of available drivers, sending a group ride offer to a plurality of mobile computing devices of users of the taxi service.

In various embodiments, the determination that the demand for drivers is greater than the supply of available drivers is based on an expected wait time to fulfill one or more passenger requests from one or more users of the taxi service. The group ride offer is to indicate at least one discounted price for one or more users that receive the group ride offer. The group ride offer includes an indication of an expected detour for at least one user that receives the group ride offer. The determination that the demand for drivers is greater than the supply of available drivers is based on a current demand for drivers. The determination that the demand for drivers is greater than the supply of available drivers is based on an expected future demand for drivers.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   determining, by a processing device, that a demand for drivers of a taxi service at a location of an event is greater than a supply of available drivers at the location of the event, wherein the event is attended by a plurality of prospective passengers;
   in response to determining that the demand for drivers is greater than the supply of available drivers, sending, by the processing device over a network, a group ride offer to a plurality of mobile computing devices associated with a plurality of users of the taxi service;
   generating, by the processing device based on the group ride offer, a route for a driver of the taxi service; and
   in response to generating the route, transmitting, by the processing device over the network to a driver computing device corresponding to the driver, navigational data based on the route to cause the driver computing device to be directed to the location of the event to fulfill a transportation request associated with the group ride offer.

2. The method of claim 1, wherein the determining that the demand for drivers is greater than the supply of available drivers is based on an expected wait time at the location of the event to fulfill one or more transportation requests from one or more of the plurality of users of the taxi service.

3. The method of claim 1, wherein the group ride offer is to indicate at least one discounted price for at least one user of the plurality of users that receive the group ride offer.

4. The method of claim 1, wherein the group ride offer includes an indication of an expected detour for at least one user of the plurality of users that receives the group ride offer.

5. The method of claim 1, wherein the determining that the demand for drivers is greater than the supply of available drivers is based on a current demand for drivers.

6. The method of claim 1, wherein the determining that the demand for drivers is greater than the supply of available drivers is based on an expected future demand for drivers.

7. An apparatus comprising:
   a memory; and
   a processing device communicably coupled to the memory, the processing device to execute instructions to:
   determine that a demand for drivers of a taxi service at a location of an event is greater than a supply of available drivers at the location of the event, wherein the event is attended by a plurality of prospective passengers;
   in response to the processing device determining that the demand for drivers is greater than the supply of available drivers, sending a group ride offer to a plurality of mobile computing devices associated with a plurality of users of the taxi service;
   generate, based on the group ride offer, a route for a driver of the taxi service; and
   in response to the processing device generating the route, transmit, to a driver computing device corresponding to the driver, navigational data based on the route to cause the driver computing device to be directed to the location of the event to fulfill a transportation request associated with the group ride offer.

8. The apparatus of claim 7, wherein the that the demand for drivers is greater than the supply of available drivers is based on an expected wait time at the location of the event to fulfill one or more transportation requests from one or more of the plurality of users of the taxi service.

9. The apparatus of claim 7, wherein the group ride offer is to indicate at least one discounted price for at least one of the plurality of users that receive the group ride offer.

10. The apparatus of claim 7, wherein the group ride offer includes an indication of an expected detour for at least one user of the plurality of users that receives the group ride offer.

11. The apparatus of claim 7, wherein the that the demand for drivers is greater than the supply of available drivers is based on a current demand for drivers.

12. The apparatus of claim 7, wherein the that the demand for drivers is greater than the supply of available drivers is based on an expected future demand for drivers.

13. At least one computer-readable non-transitory media storing one or more instructions which, when executed by a processing device, cause the processing device to:
   determine that a demand for drivers of a taxi service at a location of an event is greater than a supply of available drivers at the location of the event, wherein the event is attended by a plurality of prospective passengers;
   in response to the processing device determining that the demand for drivers is greater than the supply of available drivers, sending a group ride offer to a plurality of mobile computing devices associated with a plurality of users of the taxi service;
   generate, based on the group ride offer, a route for a driver of the taxi service; and
   in response to the processing device generating the route, transmit, to a driver computing device corresponding to the driver, navigational data based on the route to cause the driver computing device to be directed to the location of the event to fulfill a transportation request associated with the group ride offer.

14. The media of claim 13, wherein the that the demand for drivers is greater than the supply of available drivers is based on an expected wait time at the location of the event to fulfill one or more transportation requests from one or more of the plurality of users of the taxi service.

15. The media of claim 13, wherein the group ride offer is to indicate at least one discounted price for at least one of the plurality of users that receive the group ride offer.

16. The media of claim 13, wherein the group ride offer includes an indication of an expected detour for at least one user of the plurality of users that receives the group ride offer.

17. The media of claim 13, wherein the that the demand for drivers is greater than the supply of available drivers is based on a current demand for drivers.

18. The media of claim 13, wherein the that the demand for drivers is greater than the supply of available drivers is based on an expected future demand for drivers.

19. The method of claim 1, wherein the driver is a self-driven vehicle, wherein the processing device is to control movement of the self-driven vehicle by the transmitting of the navigational data.

20. The apparatus of claim 7, wherein the driver is a self-driven vehicle, wherein the processing device is to control movement of the self-driven vehicle by the transmitting of the navigational data.

\* \* \* \* \*

UNITED STATES PATENT AND TRADEMARK OFFICE
CERTIFICATE OF CORRECTION

PATENT NO. : 10,290,215 B2
APPLICATION NO. : 14/876562
DATED : May 14, 2019
INVENTOR(S) : Talmon Marco et al.

Page 1 of 1

It is certified that error appears in the above-identified patent and that said Letters Patent is hereby corrected as shown below:

In the Claims

In Claim 8, Column 26, Line 25, delete "the that" and insert --the determination that--

In Claim 11, Column 26, Line 37, delete "the that" and insert --the determination that--

In Claim 12, Column 26, Line 40, delete "the that" and insert --the determination that--

In Claim 14, Column 26, Line 63, delete "the that" and insert --the determination that--

In Claim 17, Column 27, Line 8, delete "the that" and insert --the determination that--

In Claim 18, Column 27, Line 11, delete "the that" and insert --the determination that--

Signed and Sealed this
Twenty-fifth Day of June, 2019

Andrei Iancu
*Director of the United States Patent and Trademark Office*